May 24, 1949.  N. A. TRUESDELL  2,471,293
ANTITHEFT LOCK FOR AUTOMOBILES
Filed May 20, 1947
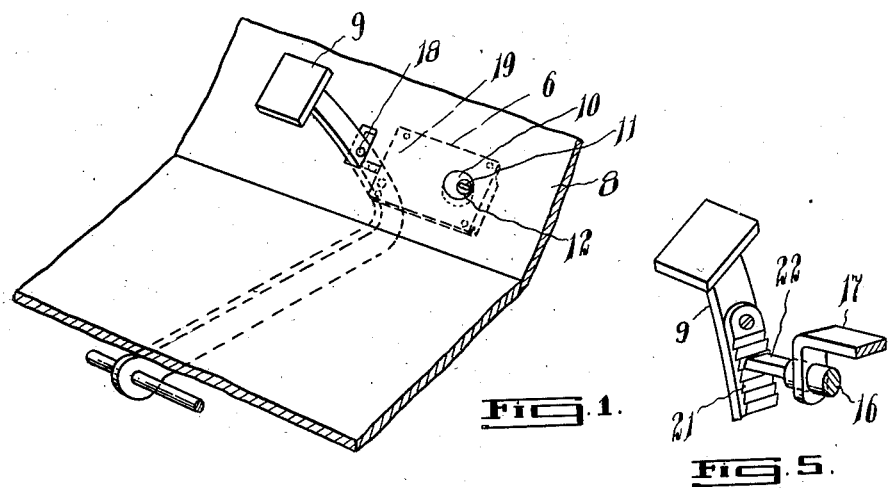
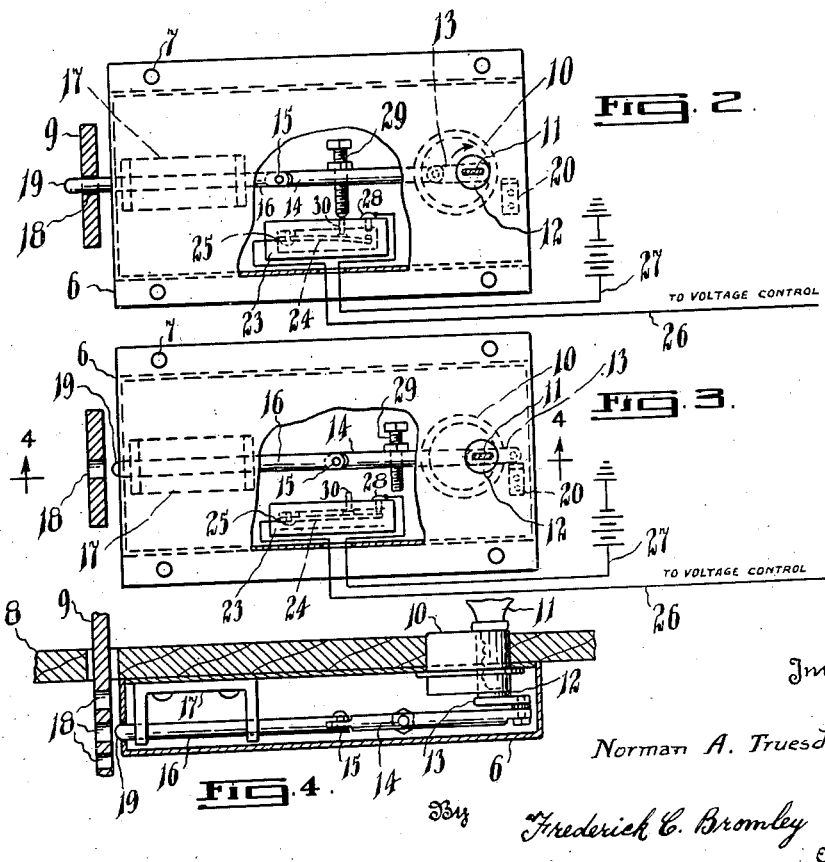
Inventor
Norman A. Truesdell
By Frederick C. Bromley
Attorney Patented May 24, 1949

2,471,293

UNITED STATES PATENT OFFICE 2,471,293

ANTITHEFT LOCK FOR AUTOMOBILES

Norman A. Truesdell, Scarboro Bluffs, Ontario, Canada

Application May 20, 1947, Serial No. 749,235

1 Claim. (Cl. 70—254)

The primary object of my invention is to provide an anti-theft device for automobiles for preventing an unauthorized person from making off with the automobile, and in one aspect comprises a pitman adapted to be actuated by the key of a cylindrical lock and connected to a slide bar by which the brake pedal is locked in depressed position so that all wheels of the vehicle are secured against movement.

In another aspect the invention combines with the aforesaid locking mechanism for the brake pedal an electric switch which is adapted to be actuated by operational movement of the pitman in order to break the circuit to the voltage control so that the entire electric system of the vehicle is put out of commission.

My invention provides a practical and effective device for guarding against the theft of a motor vehicle, and one which is simple to install and inexpensive to manufacture. It is designed to be mounted beneath the floor board of the vehicle, and its mechanism is encased to ensure that no unauthorized person may tamper with it.

The device of the present invention can be installed on any make of automobile and occupies but little space. It has the corollary advantage of serving to prevent running down of the storage battery should the lights, et cetera be accidentally left on when the vehicle is parked for any length of time.

Having related the major objects and advantages of the invention, subsidiary objects and advantages will be apparent from the ensuing specification and drawing.

In the drawing there is shown a selected embodiment of the invention, in which:

Fig. 1 is a perspective view showing the invention applied to the floor board of an automobile in juxtaposition to the foot-brake pedal in association with which it is used.

Fig. 2 is a plan view of the anti-theft device depicting a part of the casing broken away and showing how the brake pedal is locked.

Fig. 3 is a similar view to Fig. 2, but showing the brake pedal released by the unlocking of the anti-theft device.

Fig. 4 is a longitudinal section taken on line 4—4 of Fig. 3.

Fig. 5 is a fragmentary detail showing a slight modification of invention.

In carrying out the invention there is provided a suitable metal case 6 for housing the operating mechanism of the anti-theft device. Said case is of an approved construction preferably made up of two parts and attached by fasteners 7 to the lower surface of the floor board 8 of an automobile at the right hand side of the foot brake pedal 9. The case is attached in a manner such that it may not be tampered with by an unauthorized person.

A cylinder lock 10 is mounted on the case 6 at the end thereof remote from the pedal 9. Said lock is of a standard type and is disposed to extend through the floor board 8 so as to be accessible to a key 11 for turning the barrel 12 between unlocked and locked positions, which requires an angular rotation of 180°.

A crank 13 is rigidly applied to the lower end of said barrel and connected to an end of a pitman 14. The other end of said pitman is connected by a pin 15 to the inner end of a slide bar 16. Suitable means, indicated at 17, is provided within said case to guide the slide bar for endwise movement. The slide bar is disposed at right angles to the plane of movement of the pedal 9 and its outer end extends from the end of the case adjacent to said pedal.

Means are provided to enable the slide bar, when projected, to secure the pedal 9 in depressed position so that the brakes of all wheels will be locked, thus assuring that the vehicle may not be moved. The securing means preferably comprises a longitudinal series of holes 18 provided in the shank portion of the pedal receptive to the outer end 19 of the slide bar which constitutes a detent.

The arrangement provides a structure in which the slide bar is disposed in a retracted position when the key is removed from the lock, and in this position the pitman is at rear dead centre in abutment with a stop piece 20, as shown in Fig. 3. The pedal 9 is readily locked in depressed position to apply the brakes by inserting the key and turning it to locked position whereby the crank is turned through a straight angle together with the barrel 12, thus causing the pitman to slide the slide bar outwardly into engagement with a hole in the pedal which is brought into alignment with the detent end 19. Reverse movement of the key releases the pedal. The mechanism is sealed in the case, and if so desired, the top face of the lock 10 may have applied to it a radiant paint or otherwise be supplied with means by which it may be rendered discernible in the dark for locating the keyhole.

An alternate way of effecting securing engagement between the slide bar and the pedal 9 is shown in Fig. 5. This modification comprises a series of ratchet teeth 21 on the shank of the pedal adapted to be engaged by the detent end 22 of said slide bar, which is beveled.

In order to provide for rendering the ignition system and electric equipment, such as lights, et cetera, of the vehicle inoperative when the brake pedal is locked the invention comprehends a switch or circuit breaker 23 disposed in the case 6 at a side of the pitman 14 and containing a tensioned contact arm 24 electrically connected at 25 to one side 26 of the voltage control circuit. The other side 27 of this circuit is connected electrically to a contact 28 normally engaged by the arm 24, whereby the circuit is closed when said arm is not actuated. The arm 24 is actuated by a lateral projection on the pitman such as the screw 29 which engages a depressible pin 30 concurrently with the projection of the slide bar so as to depress this pin and thereby shift the arm 24 away from the contact 28 in order to break the circuit. The circuit breaker assures that the electric energy is cut off at the source of supply and this has the additional advantage of eliminating the possibility of fire arising from a short circuit when the anti-theft device is in use.

The advantages and uitility of the invention will be obvious from the preceding description and it will be understood that such changes and variations may be resorted to as come within the scope of the appended claim.

What I claim is:

In an anti-theft device for an automobile, a slide bar reciprocably mounted for endwise projection into locking engagement with the brake lever of the automobile, a relatively fixed lock having a key-controlled barrel rotatable between unlocked and locked positions, a crank on said barrel for turning therewith, a pitman connecting said crank to said slide bar for projecting the slide bar when said barrel is turned to locked position, a circuit breaker electrically connected in the electric system of the automobile, said circuit breaker having a depressible element by which it is actuated, said depressible element being disposed in the plane of the swing of said pitman, and an adjustable member transversely carried by said pitman remote from its connection with said slide rod and disposed to depress said depressible element when said pitman is swung to a dead centre position by turning said barrel to project said slide bar.

NORMAN A. TRUESDELL.

REFERENCES CITED

The following references are of record in the file of this patent:

UNITED STATES PATENTS

| Number | Name | Date |
| --- | --- | --- |
| 1,130,337 | Robb | Mar. 2, 1915 |
| 1,260,918 | Lampson | Mar. 26, 1918 |
| 1,321,216 | Krantz | Nov. 11, 1919 |
| 1,408,237 | Akers | Feb. 28, 1922 |
| 1,523,174 | Comeau | Jan. 13, 1925 |